Jan. 28, 1958 N. TETLOW 2,821,071
FLEXIBLE POWER TRANSMISSION COUPLINGS
Filed May 26, 1955 3 Sheets-Sheet 2
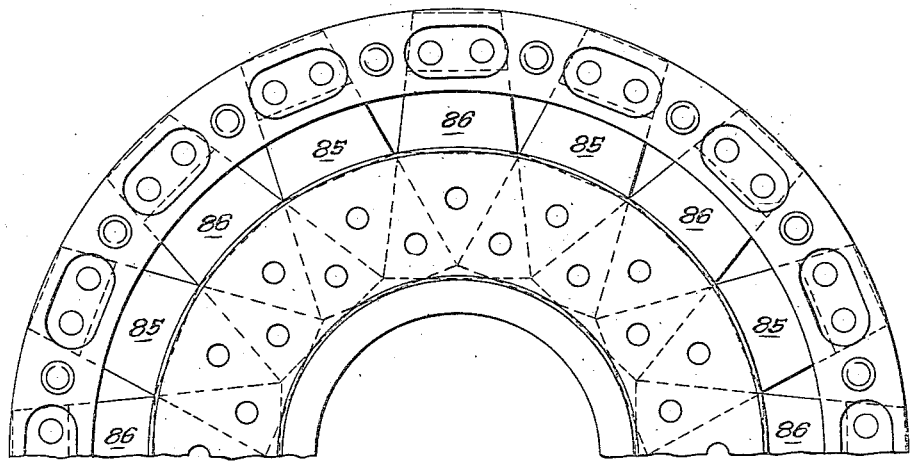
Fig. 5.
Fig. 4.
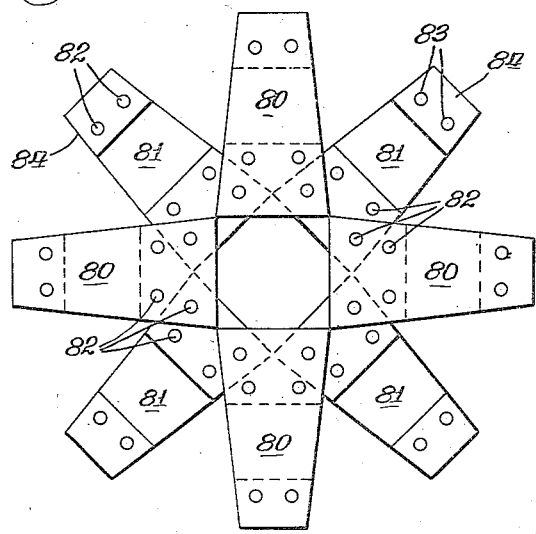
INVENTOR.
Norman Tetlow
BY William E. Lucas
Atty.

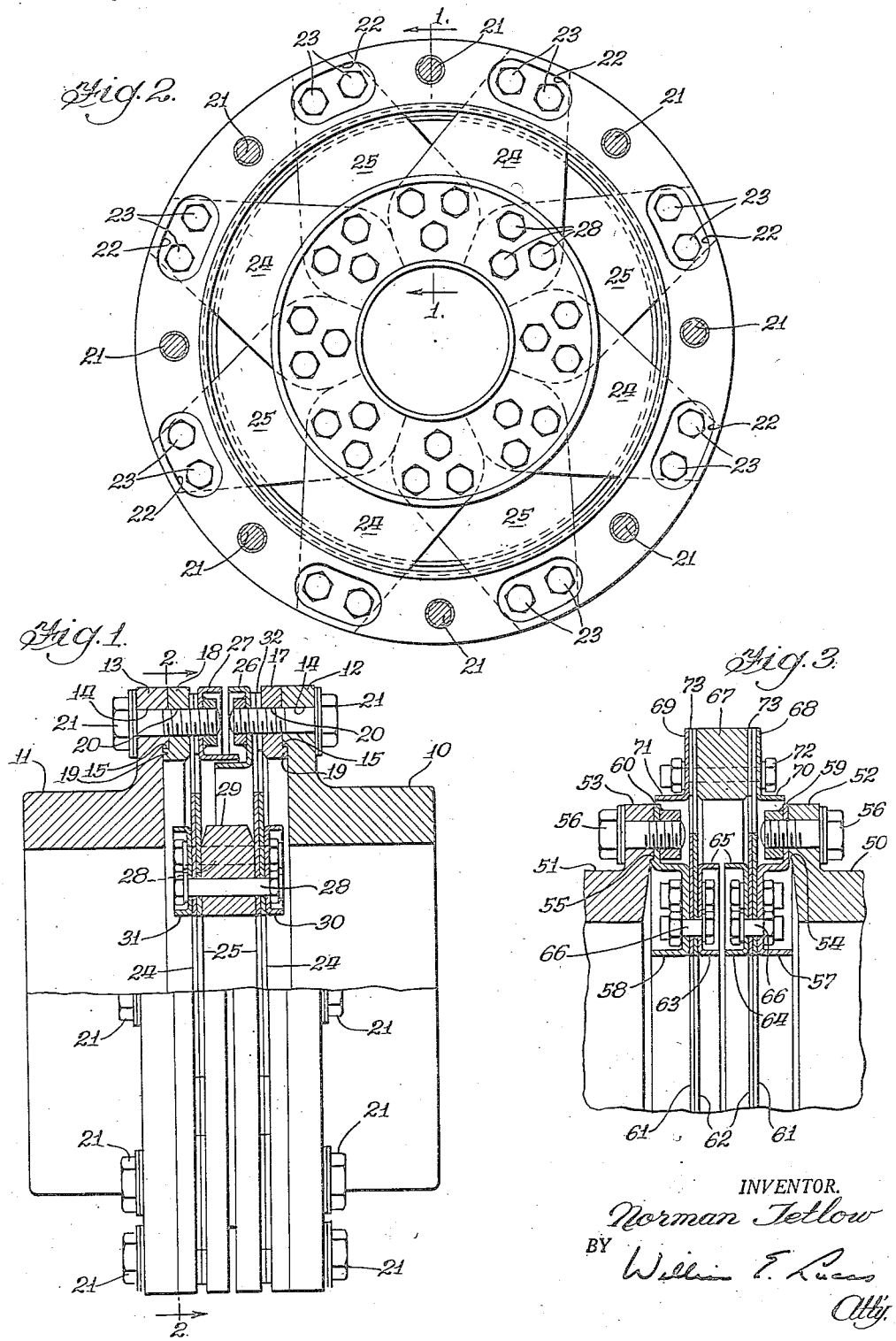

Jan. 28, 1958   N. TETLOW   2,821,071
FLEXIBLE POWER TRANSMISSION COUPLINGS
Filed May 26, 1955   3 Sheets-Sheet 3
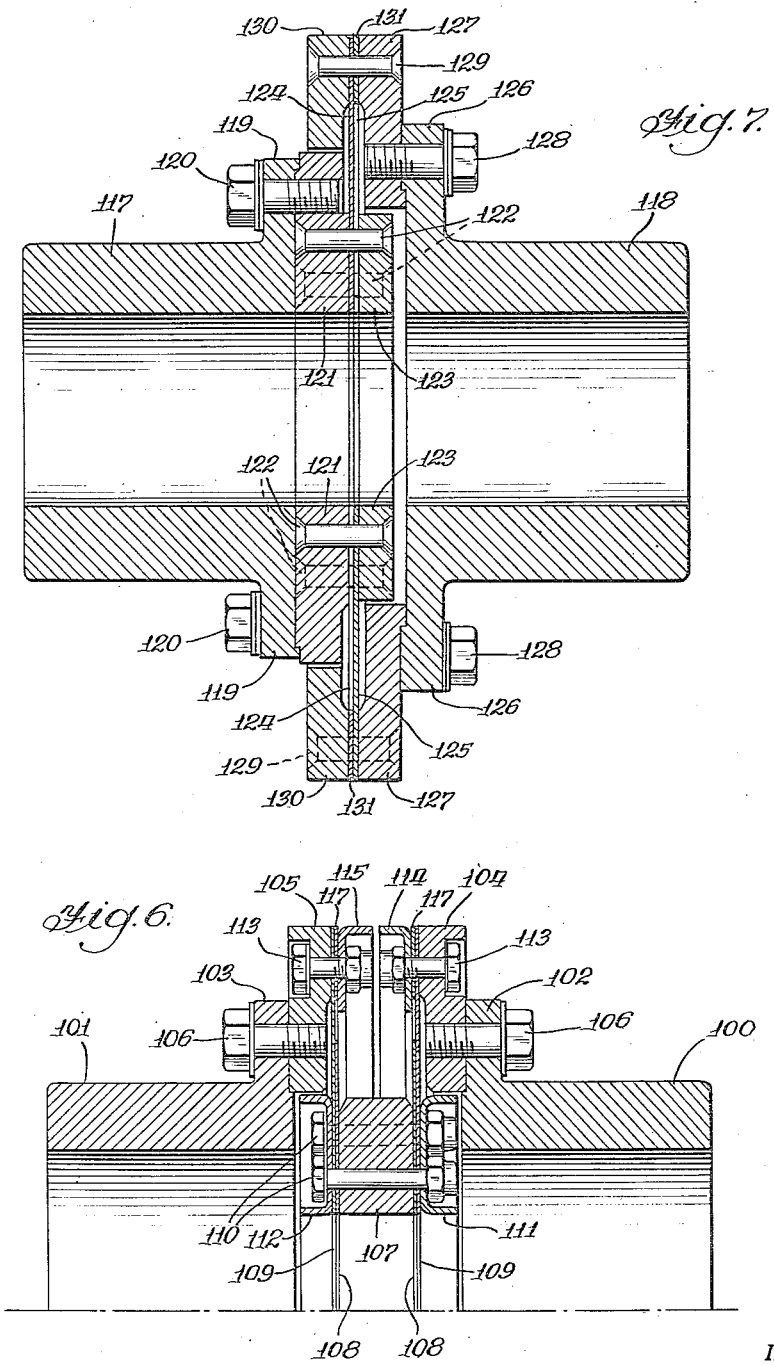
INVENTOR.
Norman Tetlow
BY William E. Lucas
Atty.

United States Patent Office 2,821,071
Patented Jan. 28, 1958

---

2,821,071

FLEXIBLE POWER TRANSMISSION COUPLINGS

Norman Tetlow, High Lane, near Stockport, England

Application May 26, 1955, Serial No. 511,332

5 Claims. (Cl. 64—15)

This invention relates to flexible power transmission couplings such as those used to transmit rotation from one shaft to another whilst permitting lateral, angular and axial flexibility.

The object of the present invention is to provide a flexible coupling having a simple construction and design of parts and high torque carrying capacity. In addition to which there is, in the coupling, a maximum interchangeability of parts and in use there is reasonably uniform distribution of stresses in the parts of the coupling that transmit torque and the possible lateral, angular and axial flexibility is unusualy high.

According to the present invention, a flexible power transmission coupling comprises a flanged driven sleeve adapted to be secured to a driven shaft and a flanged driving sleeve adapted to be secured to a driving shaft, flexible connection being provided between the said flanges by means of a plurality of power transmission links which links consist of laminar and multi-laminar elements of flexible metal or like material which are radially or approximately radially disposed with respect to the flanges of the sleeves, and are attached in overlapping relationship to one another.

Preferably the links are disposed so that alternate links about one another at their inner ends, and taper somewhat towards their outer ends.

The invention will be described further by way of example, and with reference to the accompanying drawings in which:

Figure 1 is a part sectional side elevation of one preferred form of coupling employing two banks of power transmission links;

Figure 2 is a section on the line 2—2 of Figure 1;

Figure 3 is a fragmentary section, similar to Figure 1 of an alternative form of coupling;

Figure 4 is an elevation showing diagrammatically an alternative way in which the links may be disposed and shaped;

Figure 5 is a further alternative;

Figure 6 is a fragmentary section, similar to Figure 1 of yet a further alternative form of coupling; and Figure 7 is a sectional elevation of a coupling wherein only a single bank of links is used.

In the form of the invention shown in Figures 1 and 2 of the drawings, a flexible power transmission coupling consists of two sleeves 10, 11 adapted to be secured respectively to a driving and a driven shaft (not shown), the sleeves 10, 11 having at their adjacent ends outwardly turned integrally formed flanges 12, 13 respectively, each flange 12, 13 having holes 14 drilled therethrough, parallel to the axes of said shafts at suitable spaced intervals. In addition to the holes 14, the inner face of each flange has a circumferential ridge or shoulder 15 around its periphery. To each flange 12, 13, on its inner face, is secured a retaining ring 17, 18 having on its face abutting the flange a projection 19 adapted to fit under the edge of the ridges 15 formed on the flange 12 or 13, and holes 20 are provided in said retaining rings 17, 18, complementary to the holes 14 in the flanges. Each retaining ring 17, 18 is held in position by bolts or set screws 21 inserted through the holes 14, 20.

At positions in the retaining rings 17 and 18 intermediate the holes 20 there are provided pairs of holes which serve to accommodate pairs of bolts 23, the heads of which are countersunk in the recesses 22 and which are adapted to hold rigidly in position the outer edges of layers of radially disposed flexible metal power transmission links 24, 25 a bank of which is provided on each retaining ring 17, 18. The number of links 24, 25 in each layer is determined by the flexibility required in the coupling. Each link 24, 25 in a layer is of substantially triangular or trapezoidal shape and has at its outer edge (that is in a position nearest to the apex) a pair of holes to accommodate the bolts 23. There may be attached, if desired, in positions abutting the sides of the transmission links 24, 25 remote from the flanges 12, 13 guard rings 26, 27 held in position by the bolts 21, 23. Each guard ring 26, 27 has flanges turned at right angles to and projecting away from its associated retaining ring 17, 18, the lower of said flanges overlapping one another as illustrated. This overlapping serves, in the event of failure of the links 24, 25, to prevent the sleeves 10, 11 from moving out of alignment to any substantial degree.

The inner portion of each transmission link 24, 25 has six holes drilled therethrough, there being two holes nearest to the base and four holes slightly nearer to the apex of the link, the six holes being disposed in two groups of three in triangular form.

A convenient number of layers of multi-laminar links 24, 25 is two, although more than two layers may be provided as necessary. As shown, one layer comprises four of the radial triangular links 24 and the second layer comprises the four links 25. These are attached at their bases, by means of bolts 28 in the groups of holes already described to an intermediate ring 29 disposed concentrically with, and midway between the driving and driven sleeves 10, 11. The links bolted to the flange 12 of the driving sleeve 10 are attached at one side of the intermediate ring 29 and the links bolted to the flange 13 of the driven sleeve 11 are attached at the other side thereof. As shown in Figure 2, the links 24 overlap the links 25 at their bases, and the links of each layer abut one another so that the bolts 28 serve to secure all the layers collectively to the intermediate ring 29.

By virtue of the fact that each group of three holes in the overlapping group of links 24 is complementary to a group of three holes in the overlapped layer of links 25 rigid bolting is attained and the fact that this overlapping of layers of links occurs ensures that the torque carrying capacity at the inner portion of the power transmission links 24, 25 is approximately equal to the torque carrying capacity of the outer portion of said links.

Concentric with the intermediate ring 29 and at each side thereof is a channel-sectioned clamping ring 30, 31, the head and nuts of the bolts 28 being contained in the channel and shielded thereby. These clamping rings 30, 31 ensure even distribution of stresses throughout the links 24, 25 of the coupling. Also, since the overlapping of the inner ends of the links results in a greater thickness at the bases of the links than at their outer ends, spacers or packing pieces 32 are provided at the outer ends of the links.

In use, the coupling is secured between a driving and a driven shaft (not shown) and the power transmitted through the coupling is taken from the driven shaft through the retaining ring 17 and power transmission links 24, 25 at one side of the coupling through the intermediate ring 29 attached at the inner edge of such links, through the links 24, 25 and retaining ring 18 attached to the flange 13 and into said driven shaft.

In a second form of the invention the means for transmitting power from the driving to the driven shaft is the same but the position of the intermediate ring and the retaining rings are reversed.

Referring now to Figure 3 of the drawings, sleeves 50, 51 are provided for a driving and a driven shaft (not shown) and each has a flange 52, 53 with an annular ridge 54, 55 formed on the sides thereof remote from the sleeves 50, 51. Attached to the flanges 52, 53 by means of bolts or set screws 56 are channel-sectioned retaining rings 57, 58, the outer flange of each retaining ring having an outwardly extending portion 59, 60, part of which is of reduced thickness and adapted to abut the respective peripheral ridges 54, 55 on the flange 52, 53. In each retaining ring 57, 58 are drilled holes coinciding with complementary holes in the base portions of groups of multi-laminar power transmission links 61, 62, similar to those described in the previous example, such power transmission links extending in an outward direction from the retaining rings 57, 58. There may be further attached on the faces of the groups of power transmission links 61, 62, not abutting the retaining rings 57, 58, guard rings 63, 64, having flanges 65 directed away from their associated links 61, 62 and at right angles thereto, and directly opposite to each other. The power transmission links 61, 62 are in overlapping relation with each other, as in the preceding example, and are rigidly secured between the retaining rings 57, 58 and the guard rings 63, 64 by bolts 66 passing through complementary holes therein.

At the apices of the groups of transmission links 61, 62 and disposed between the groups attached to the sleeve 50 for the driving shaft and the groups attached to the sleeve 51 for the driven shaft, is an intermediate ring 67, and abutting the faces of the links 61, 62 remote from the intermediate ring are attached outer clamping rings 68, 69, these latter having, on their edges nearest to the axis of the sleeves 50, 51, flanges 70, 71, directed at right angles to and away from their respective power transmission links as shown. These outer clamping rings 68, 69, power transmission links 61, 62 and the intermediate ring 67, have, drilled therethrough, pairs of holes adapted to carry pairs of securing bolts 72, which hold the parts in rigid form.

The overlapping relationship of the links 61, 62 at the retaining rings 57, 58 results in a greater thickness at the bases of the links than at the apices thereof, and this tends to reduce the axial flexibility of the coupling. Accordingly therefore, packing pieces or interleaving 73 may be provided between the links 61 and the intermediate ring 67 and the links 62 and the respective outer clamping rings 68, 69.

In use, the power from the driving shaft (not shown) is transmitted from the sleeve 50 through the retaining ring 57 to the groups of power transmission links 61, 62 attached thereto, through the intermediate ring 67 to the further links 61, 62 to the retaining ring 58 and subsequently through the sleeve 51 to the driven shaft.

The provision of guard rings between the transmission links, as described in the foregoing examples, serves to prevent any undue distortion of the driving and/or driven shafts in the event of fracture of any of the transmission links in the coupling.

The invention is not, of course, limited to the specific details of these embodiments already described, and variations may be made in the shape, thickness and number of links provided according to the desired flexibility and torque carrying capacity of the coupling. For example, as illustrated in Fig. 4, the multi-laminar power transmission links 80, 81 may be each made in the shape of a trapezium in which the sides converge only very slightly at their outer ends and in this case there may be drilled four holes 82, instead of six, at the end of each link nearest to the axis of the coupling, as shown in the drawings. The numbers of bolt holes may be varied in view of the fact that it is preferable to have more bolt holes at the bases of the links near to the axis of the coupling than at the apices of the links which are disposed at the periphery of the coupling. It will be also realized from the figure under consideration that there need only be two holes 83 in the end of the links remote from the axis of the shafts, and through the spacers or packing pieces 84. Such links may be used in either of the coupling constructions hereinbefore described.

Figure 5 shows diagrammatically an alternative construction, in which links 85, 86 identical with those shown in Figure 4 are used to transmit greatly increased torque, the coupling being of larger dimensions in order to accommodate an increased number of such transmission links.

Referring now to Figure 6 as previously stated, this figure is a fragmentary sectional elevation of a coupling very similar to that illustrated in Figures 1 and 2 of the drawings.

The coupling comprises sleeves 100, 101 for driving and driven shafts (not shown) having flanges 102, 103 to which are bolted annular retaining rings 104, 105 respectively by set screws 106. Concentrically disposed between the two sleeves 100, 101 is an intermediate ring 107, and extending radially therefrom at each side are two layers of power transmission links 108, 109. Bolts 110 passing through the intermediate ring 107 serve to clamp the links tightly between the clamping rings 111, 112 and the intermediate ring 107 and the clamping rings are suitably flanged so as to shroud the heads of the bolts and the nuts thereon.

The links 108, 109 extend radially outwardly as shown, and the alternate individual links abut and overlap as heretofore described. The links also taper outwardly, and their narrow outer ends terminate flush with the outer circumferential edges of the retaining rings 104, 105, to which latter they are secured by spacers 117 and bolts 113. Confronting guard rings 114 and 115 are secured against the links 108 and 109 by means of the bolts 113 and these serve the same purpose as the rings 26 and 27 of Figure 1, although no overlapping flanges are provided thereon.

In Figure 7 of the drawings there is shown yet a further form of coupling according to the invention, which, in contradistinction to the preceding examples, only employs a single bank of multi-laminar power transmission links. In the drawing, the coupling comprisese two sleeves 117 and 118 which are adapted to be connected to driven and driving shafts (not shown) respectively, or vice versa.

The sleeve 117 is flanged at 119 and has secured thereto by set screws 120, an inwardly directed retaining ring 121. Radially disposed relative to the ring 121 and riveted thereto by rivets 122 which pass through an inner clamping ring 123 are two layers of power transmission links 124 and 125, which may be similar to the links of any of the preceding examples.

The sleeve 118 is flanged at 126 and has secured thereto an outwardly directed retaining ring 127 by means of set screws 128 to which are secured the outer ends of the power transmission links 124 and 125, by means of rivets 129 which pass through an outer clamping ring 130.

Since the links are arranged in alternate overlapping relationship at their inner ends, small packing or interleaving elements such as are indicated at 131 are provided alternately at their outer ends to ensure that tight riveting of the links to the outer retaining ring 127 is obtained.

It is to be noted that there are only very small clearances between the outer clamping ring 130 and the inner retaining ring 121 and also between the outer retaining ring 127 and the inner clamping ring 123, so that, in the event of failure of the power transmission links, for example, by overloading the two sleeves 117 and 118 cannot move out of alignment to any substantial degree, and damage to the driving and driven shafts, or the mechanism which may be connected thereto, cannot occur.

This coupling, whilst being able to transmit torque of approximately the same magnitude as can be transmitted by a coupling according to Figures 1, 3 or 6 of similar dimensions, is approximately only half as flexible, axially, as the latter couplings, so that this construction would be used where a high degree of axial flexibility is not required.

In all the embodiments of the invention illustrated, it is to be noted that the power transmission links with their retaining rings, and the intermediate ring, if present, can be withdrawn as a single unit from between the driven sleeve and the driving sleeve, merely by removal of the setscrews holding the retaining rings to the flanges. In each case, slight axial compression of the unit is necessary so that the retaining rings clear the shoulders in the flanges, and the flexibility of the power transmission links facilitates this action. This possibility of removing the links and rings is a considerable advantage in that it is possible to repair a damaged coupling without the necessity of disturbing the driving and driven shafts.

In all the preceding examples, the number of links in any group and the number of layers of links provided at each side of the intermediate ring may be varied to meet requirements, dependent upon the use to which the coupling is to be put, and standard links may be employed for various sizes of coupling. In addition, whilst the couplings illustrated all employ links which are substantially radially arranged, it will be appreciated that they need not be precisely radial. For example in the couplings of Figures 1, 2 and 6 the links could be arranged say tangentially to the intermediate rings.

Having thus described the invention, what I claim as new and desire to secure by United States Letters Patent is:

1. A flexible power transmission coupling comprising a flanged driven sleeve adapted to be secured to a driven shaft, a flanged driving sleeve adapted to be secured to a driving shaft, and coupling means interconnecting said sleeves and comprising a plurality of flexible multi-laminar power transmission links between the said flanges and disposed in generally radial directions with respect to the flanges of the sleeves; said power transmission links abutting and overlapping each other at their inner ends and tapering towards their outer ends, with spacers interleaved on the opposite sides of the outer ends of alternate links to compensate for the difference between the thickness at the outer ends thereof and the thickness at the overlapping inner ends, and with a removable retaining ring provided on each of said flanges, the power transmission links being secured to said retaining rings so that the retaining rings and the links can be withdrawn from the coupling without disturbing the sleeves.

2. A flexible power transmission coupling consisting of a flanged driven sleeve adapted to be secured to a driven shaft, a flanged driving sleeve adapted to be secured to a driving shaft, and a removable coupling assembly interconnecting the said sleeves and consisting of a pair of retaining rings and an intermediate ring secured in assembled relationship with each other by two similar banks of flexible laminar power transmission links; said links being arranged in generally radial directions and having their inner ends in abutting and overlapping relationship.

3. A flexible power transmission coupling consisting of a flanged driven sleeve adapted to be secured to a driven shaft, a flanged driving sleeve adapted to be secured to a driving shaft, and a removable coupling assembly interconnecting the said sleeves and consisting of a pair of retaining rings and an intermediate ring secured in assembled relationship with each other by two similar banks of flexible laminar power transmission links; the links of each of said banks having their inner ends in abutting and overlapping relationship and secured to the opposite faces of the intermediate ring by a pair of clamping rings mounted thereon; with the outer ends of the links of each bank secured to one of the aforementioned retaining rings by a clamping ring mounted thereon.

4. A flexible power transmission coupling as claimed in claim 3 wherein the clamping rings have overlapping flanges closely disposed in concentric relation with each other which serve in the event of failure of the links, to prevent the sleeves from moving out of alignment to any substantial degree.

5. A flexible power transmission coupling consisting of a flanged driven sleeve adapted to be secured to a driven shaft, a flanged driving sleeve adapted to be secured to a driving shaft, and a removable coupling assembly interconnecting the said sleeves and consisting of a pair of retaining rings and an intermediate ring secured in assembled relationship with each other by two similar banks of flexible laminar power transmission links; the links of each of said banks having their inner ends in abutting and overlapping relationship and secured to the opposite faces of the intermediate ring by a pair of clamping rings mounted thereon; with the outer ends of the links of each bank secured to one of the aforementioned retaining rings by a clamping ring mounted thereon, with the alternate links of each of said banks having spacers interleaved on the opposite sides of their outer ends to compensate for the difference between the thickness at the outer ends and the thickness at the overlapping inner ends.

References Cited in the file of this patent

UNITED STATES PATENTS

| | | |
|---|---|---|
| 1,562,437 | Clapham | Nov. 24, 1925 |
| 1,585,631 | Heinrich | May 18, 1926 |
| 2,251,722 | Thomas | Aug. 5, 1941 |
| 2,627,733 | Amberg | Feb. 10, 1953 |